US010927264B2

(12) United States Patent
Branger et al.

(10) Patent No.: US 10,927,264 B2
(45) Date of Patent: Feb. 23, 2021

(54) PRIMER COMPOSITION

(71) Applicant: SIEGWERK DRUCKFARBEN AG & CO. KGAA, Siegburg (DE)

(72) Inventors: Christophe Branger, La Balme de Sillingy (FR); Claude Deporte, Saint Cergues (FR)

(73) Assignee: SIEGWERK DRUCKFARBEN AG & CO. KGAA, Siegburg (DE)

( * ) Notice: Subject to any disclaimer, the term of this patent is extended or adjusted under 35 U.S.C. 154(b) by 271 days.

(21) Appl. No.: 15/774,472

(22) PCT Filed: Oct. 11, 2016

(86) PCT No.: PCT/EP2016/074262
§ 371 (c)(1),
(2) Date: May 8, 2018

(87) PCT Pub. No.: WO2017/080734
PCT Pub. Date: May 18, 2017

(65) Prior Publication Data
US 2020/0115560 A1 Apr. 16, 2020

(30) Foreign Application Priority Data
Nov. 13, 2015 (EP) ..................................... 15194411

(51) Int. Cl.
| C09D 5/00 | (2006.01) |
| C09D 7/40 | (2018.01) |
| C09D 7/61 | (2018.01) |
| C09D 5/02 | (2006.01) |
| C08L 1/02 | (2006.01) |
| C08L 3/02 | (2006.01) |
| C08L 31/04 | (2006.01) |
| C08L 67/00 | (2006.01) |

(52) U.S. Cl.
CPC ............ *C09D 5/002* (2013.01); *C09D 5/022* (2013.01); *C09D 7/61* (2018.01); *C09D 7/69* (2018.01); *C08L 1/02* (2013.01); *C08L 3/02* (2013.01); *C08L 31/04* (2013.01); *C08L 67/00* (2013.01)

(58) Field of Classification Search
None
See application file for complete search history.

(56) References Cited

U.S. PATENT DOCUMENTS

| 4,740,591 | A | 4/1988 | Dilling et al. |
| 5,008,378 | A | 4/1991 | Dimitri |
| 5,228,857 | A | 7/1993 | Roland |
| 5,407,771 | A | 4/1995 | Landa et al. |
| 8,486,224 | B2 | 7/2013 | Öhman et al. |
| 10,053,597 | B2 * | 8/2018 | Egan ....................... C08L 33/08 |
| 2004/0014875 | A1 * | 1/2004 | Russo ......................... C09J 9/00 524/557 |
| 2004/0110870 | A1 * | 6/2004 | Liu .......................... C09D 5/185 523/179 |
| 2004/0134378 | A1 * | 7/2004 | Batdorf ..................... C09D 5/18 106/18.13 |
| 2007/0231571 | A1 * | 10/2007 | Lane ........................ B29C 48/08 428/354 |
| 2008/0255017 | A1 * | 10/2008 | Dettinger ................... A61L 9/05 510/191 |
| 2009/0054580 | A1 * | 2/2009 | Joachim ................... C03C 25/26 524/443 |
| 2009/0297818 | A1 * | 12/2009 | Williams ............... B29C 70/504 428/292.4 |
| 2013/0224395 | A1 | 8/2013 | Regnier |
| 2015/0218426 | A1 * | 8/2015 | Clay ....................... C09J 131/04 524/147 |

FOREIGN PATENT DOCUMENTS

| CN | 103045110 A | * | 4/2013 | ............. C08L 33/08 |
| CN | 103555042 A | * | 2/2014 | |
| EP | 1 769 042 B1 | | 3/2011 | |
| EP | 1 794 363 B1 | | 2/2012 | |
| EP | 2 426 176 A1 | | 3/2012 | |
| EP | 2 534 213 B1 | | 10/2013 | |
| EP | 2 820 056 B1 | | 11/2016 | |
| KR | 1020060006690 B1 | * | 10/2006 | |

(Continued)

OTHER PUBLICATIONS

KR1020060006690B1—english translation (Year: 2006).*
CN-103045110-A—english translation (Year: 2013).*
Lora et al., "Recent Industrial Applications of Lignin: A Sustainable Alternative to Nonrenewable Materials", Journal of Polymers and the Environment, vol. 10, No. 112, Apr. 2002, pp. 39-48.
European Search Report Corresponding to 15194411.3 dated May 31, 2016.

(Continued)

*Primary Examiner* — Stefanie J Cohen
(74) *Attorney, Agent, or Firm* — Davis & Bujold PLLC; Michael J. Bujold

(57) ABSTRACT

A water-based primer composition comprising an porous submicron silica dispersion, preferably in an amount from 10 to 30 wt.-% based on the weight of the entire composition, starch, preferably in an amount from 10 to 30 wt.-% based on the weight of the entire composition, and at least one component selected from the group consisting of a further polysaccharide, a hemicellulose, lignin, a styrene-acrylic emulsion, a polyvinylacetate and a sulfopolyester. Further, use of the composition for preparing a primer layer on a substrate, to a method of printing on a substrate, comprising the steps of preparing a primer layer on at least a part of one surface of the substrate using the composition, and printing on the primer layer using a liquid toner, as well as to an article manufactured with the method is disclosed.

17 Claims, No Drawings

(56) References Cited

FOREIGN PATENT DOCUMENTS

| WO | 01/07508 A1 | 2/2001 | |
|---|---|---|---|
| WO | 01/22172 A1 | 3/2001 | |
| WO | 01/58696 A1 | 8/2001 | |
| WO | 2007/124400 A2 | 11/2007 | |
| WO | 2011/100379 A1 | 8/2011 | |
| WO | WO-2014111292 A1 * | 7/2014 | ............. C08L 33/08 |

OTHER PUBLICATIONS

International Search Report Corresponding to PCT/EP2016/074262 dated Nov. 11, 2016.
Written Opinion Corresponding to PCT/EP2016/074262 dated Nov. 11, 2016.

* cited by examiner

PRIMER COMPOSITION

The present invention is related to a primer composition, in particular to a water-based primer composition to be used in combination with a liquid toner.

The use of on-demand digital printing machines utilizing liquid electrophotographic systems has become increasingly popular, in particular for short-run printing. In such systems, liquid toner images are formed on a photosensitive drum and then electrically transferred onto an intermediate transfer blanket or belt for printing on a paper or polymeric film sheet or web.

Liquid toners for liquid electrophotographic systems are known and commercially available, for example ElectroInk for Hewlett-Packard's HP Indigo® printing devices. Generally, a liquid toner differs from a dry toner (which is used, for example, in conventional laser printing devices) in that in a liquid toner system electrically charged particles (which may be coloured) are encapsulated in a polymer and dispersed in non-conducting transfer liquid. Said transfer liquid is typically a mineral oil such as Isopar (solvent of branched-chain aliphatic hydrocarbons and mixtures thereof, e.g., isoparapffinic hydrocarbon fractions by EXXON) or Marcol (highly refined petroleum oils by EXXON). An example of a liquid toner is disclosed in U.S. Pat. No. 5,407,771.

However, as a consequence of their composition, liquid toners do not transfer well and/or adhere well to certain substrates. In order to improve adhesion, it has been suggested to treat those substrates with a coating or primer to enhance the adhesion of liquid toners.

A number of coatings or primers have been developed for use on substrates such as polymeric films which render the surface of the films more receptive to liquid toners.

For example, in EP-1 769 042 B1 a primer coating is disclosed which comprises a combination of a copolymer of ethylene and acrylic or methacrylic acid and an aliphatic polyurethane dispersion together with a metal hydroxide antiblocking agent.

In EP-2 534 213 A1, a primer coating is disclosed which includes a natural rosin dispersion comprising a hydrogenated hydrocarbon rosin or rosin ester and a protective colloid forming material, and a dispersion of a copolymer of ethylene and acrylic or methacrylic acid.

In EP-2 426 176 A1, a solvent-free energy curable liquid primer coating for enhancing ink adhesion to a substrate comprising a polyester acrylate, at least one acrylated amine, and optionally, a photoinitiator is disclosed.

In EP-2 820 056 A1, A primer coating for enhancing adhesion of liquid toner to a substrate is described, said coating comprising an aliphatic polyurethane dispersion and an anionic wax emulsion, wherein said coating is substantially free of ethylene acrylic acid.

In WO 01/22172 A1, a primer for a liquid toner is described, wherein said primer comprises at least 25% silica in addition to a binder material. The binder material is preferably an acrylic polymer. It is described that only with such high amounts of silica, preferably nanosilica having a particle size in the range from 5-50 nm, the primer coating becomes "tonerphilic", whereas with primer coatings comprising a lower amount of silica only a poor compatibility with liquid toner was observed.

In WO 01/07508 A1, a coating for improving adhesion of gelatin to a polyester substrate is described, wherein said coating comprises a high amount (85-98%) of a sulfopolyester. It is not described that said coating should be suitable as a primer for a liquid toner.

In WO 01/58696 A1, a primer for a liquid toner is described which comprises two different materials, one having affinity for the plastic substrate, such as polyethylene imine, and the other material, for example, an acrylate copolymer/styrene-butadiene copolymer, having affinity for both the plastic substrate and the toner. Also, a surfactant is present.

The above described primer compositions from the prior art are still not fully satisfactory in that each primer composition suffers from certain drawbacks, such as environmental concerns, costs of the used materials or unsatisfactory adhesion when used with at least some liquid toners and/or substrates.

Accordingly, a need exists for a new primer composition to be used with liquid toners.

This problem has been solved by a primer composition as defined in the appending claims.

In particular, the present invention is related to a water-based primer composition comprising
- a porous submicron silica, preferably in the form of a dispersion, preferably in an amount from 10 to 30 wt.-% based on the weight of the entire composition,
- starch, preferably in an amount from 10 to 30 wt.-% based on the weight of the entire composition, and
- at least one component selected from the group consisting of a further polysaccharide, a hemicellulose, lignin, styreneacrylic emulsion, a polyvinylacetate and a sulfopolyester.

It has been found that a primer composition comprising a combination of a submicron silica, preferably in the form of a dispersion, starch and a component selected from a polysaccharide, hemicellulose, lignin, styrene-acrylic emulsion, sulfopolyester and polyvinylacetate, results in a primer composition showing satisfactory characteristics when used with a liquid toner.

According to the present invention, the term "primer composition" refers to a composition which is suitable for forming a layer on the surface of the substrate, herein referred to as "primer layer", which renders the surface more compatible for the application of a liquid toner, in particular by enhancing the adhesion of liquid toners to the substrate. In addition, the primer layer prepared from the primer composition has to possess sufficient adhesion to the substrate and should not adversely interfere with the printing process. For example, the primer layer should exhibit a smooth surface so as to positively influence the gloss of the final print applied onto said primer layer.

The primer composition of the present invention is water-based. According to the present invention, the term "water-based" defines a composition which is essentially composed of water as the only solvent present in the composition. Other solvents, in particular organic solvents, should not be present in an amount exceeding 10 wt.-%, preferably not exceeding 5 wt.-%, of the weight of the entire composition.

According to a preferred embodiment of the present invention, the the primer composition comprises water in an amount from 10 to 70 wt.-%, preferably 15 to 60 wt.-%, based on the weight of the entire composition.

One component of the composition of the present invention is a porous submicron silica, preferably in the form of a dispersion. Silica (i.e. silicon dioxide) is available in different particle sizes. Colloidal silica has a particle size below 100 nm and is non-porous. Submicron silica has a particle size in the range from 200 to 400 nm, preferably 300 to 400 nm, and is porous. Micronized silica has a particle size in the range from 3 to 15 µm and is also porous. All particle sizes are measured with a Malvern® Mastersizer® 2000. According to the present invention, submicron silica is used, since it combines the provision of surface smoothness in the primer layer with its capacity of absorption, due to its small particle size and its porosity.

The submicron silica may be cationic or anionic. According to the present invention, an anionic submicron silica dispersion is preferred.

Preferably, a water-borne silica dispersion is used, i.e. water is used as the dispersing agent. The solids content of such a dispersion is typically in the range from 20 to 40%, preferably 25 to 35%. Said dispersion can be prepared by blending the submicron silica with the water.

According to the present invention, for example, submicron silica dispersions may be used which are commercially available from Grace, Omya, Huber or Evonik. Other suitable submicron silica products are available from Denka.

According to the present invention, the primer composition preferably comprises the submicron silica dispersion in an amount from 10 to 30 wt.-% based on the weight of the entire composition, more preferably in an amount from 15 to 25 wt.-% based on the weight of the entire composition, wherein said dispersion has a solids content in the range from 20 to 40%, preferably 25 to 35%.

A further component of the composition of the present invention is starch. Starch is a biopolymer consisting of amylose and amylopectin molecules. The ratio of amylose and amylopectin, which typically ranges from 20:80 to 30:70, is important for the characteristics of a specific type of starch. Amylose is a linear molecule and shows a high tendency for crystallization (retrogradation) resulting in insoluble adducts in cold water. Amylopectin is a branched molecule which shows slow jellification, forming opaque and highly viscous preparations after some days in cold water. The number average molecular weight measured by GPC depends on the origin and the nature of the starch and can range up to $10^6$ Da (in some cases even higher), with amylopectin having a higher molecular weight than amylose. Commonly used types of starch are maize starch, potato starch, rice starch, tapioca starch, corn starch, pea starch and wheat starch, each named after the plant from which it can be obtained. All types of starch are well-known and commercially available and need not be discussed further here in detail. According to the present invention, preferably rice starch is used.

According to the present invention, the primer composition preferably comprises starch in an amount from 10 to 30 wt.-% based on the weight of the entire composition, more preferably in an amount from 15 to 25 wt.-% based on the weight of the entire composition. Thus, as a further advantage the compositions of the present invention comprise a significant content of renewable material, making them more environment-friendly than prior art compositions discussed above.

Furthermore, the composition of the present invention comprises at least one additional component selected from the group consisting of a further polysaccharide, hemicellulose, lignin, styreneacrylic emulsion, polyvinylacetate and a sulfopolyester.

According to a preferred embodiment, the compositions of the present invention comprise either a further polysaccharide, or a compound selected from hemicellulose or lignin or styreneacrylic emulsion, or a blend of polyvinylacetate and a sulfopolyester.

According to a specific first preferred embodiment, the composition of the present invention comprises a porous submicron silica dispersion and starch, in combination with a further polysaccharide. "Further polysaccharide" means here that said polysaccharide should be different from starch, which is also a polysaccharide but which is already present in the composition of the present invention.

Polysaccharides are known to a skilled person and need not be discussed here in detail. According to the present invention, a preferred further polysaccharide is gum arabic, also called gum acacia. Gum arabic is a well-known naturally occurring substance which need not be discussed in detail here. Chemically, gum arabic is a polysaccharide based on salts of arabinic acid and can be degraded through hydrolysis into d-galactose, l-arabinose, d-glucuronic acid, and l-rhamnose. Gum arabic freely dissolves in water. The gum arabic to be used according to the present invention is preferably in powder form.

According to a preferred embodiment of the present invention, the gum arabic is provided in the form of a varnish, wherein the varnish is preferably added in in an amount from 20 to 60 wt.-% based on the weight of the entire composition, more preferably in an amount from 30 to 50 wt.-% based on the weight of the entire composition. Said varnish comprises preferably 10 to 30%, more preferably 10 to 20% of the polysaccharide in combination with one or more solvents. As solvent, predominantly water is used, either alone or in a blend with a little amount (1 to 10 wt.-% of the amount of the water in the varnish) of an alcohol, for example ethanol. Said varnish is prepared by blending the gum arabic powder with the solvent(s). The amounts of the porous submicron silica dispersion and the starch in this embodiment are as described above.

According to a specific second preferred embodiment, the composition of the present invention comprises porous submicron silica dispersion and starch, in combination with at least one component selected from the group consisting of a hemicellulose and lignin.

Lignin is a biopolymer occurring in plants, such as wood. It consists of phenolic macromolecules with varying structure and is renewable. A sample structure of lignin is shown below:
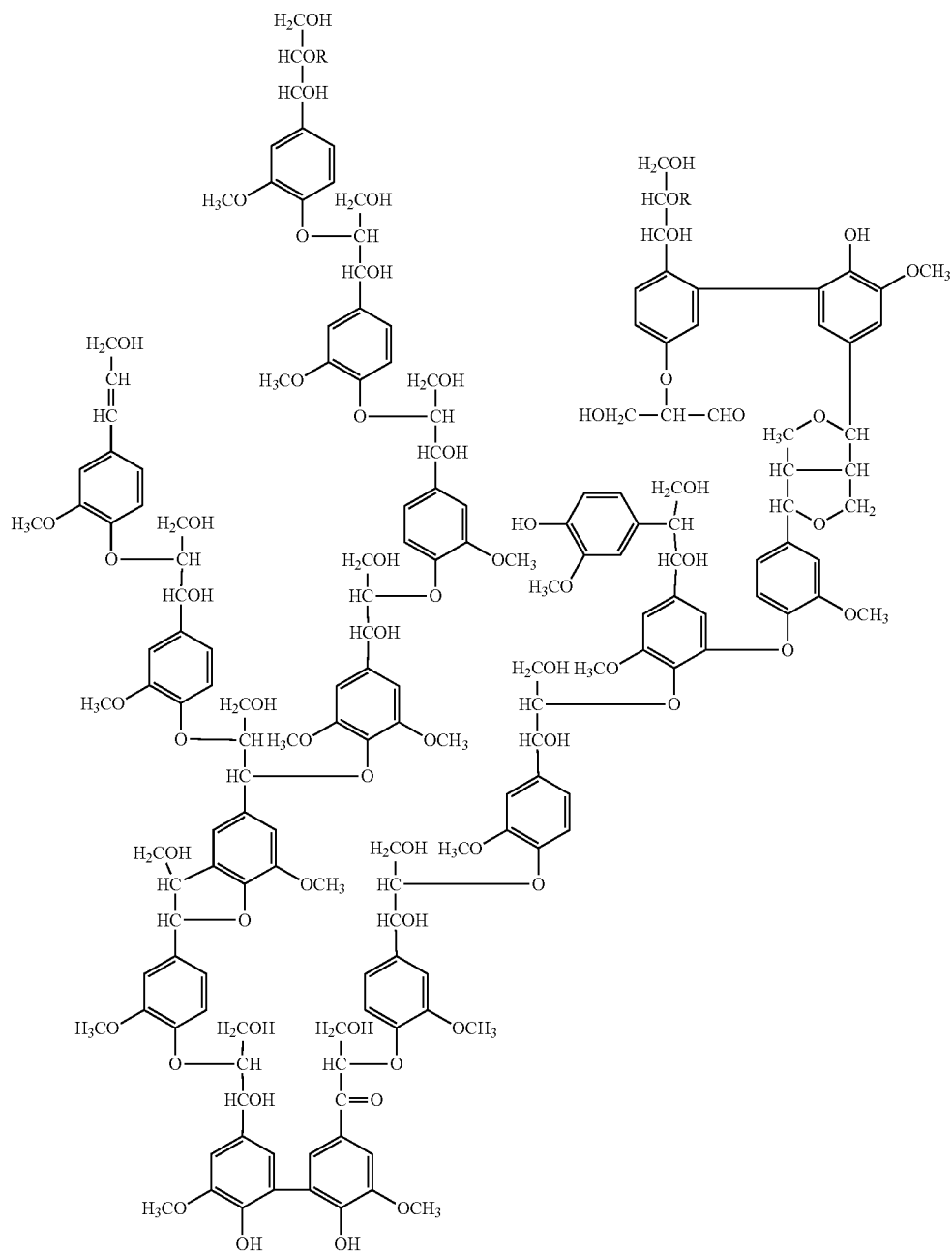

-continued

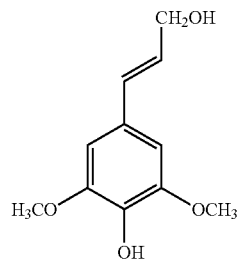

3

The units 1, 2 and 3 represent phenyl propane monomers that can be found in lignin: 1) p-coumaryl alcohol; 2) coniferyl alcohol; 3) syringyl alcohol.

Industrially, lignin is obtained as a by-product of the paper-pulping process, or any other process aiming at separating the various components of the lignocellulosic biomass to valorise in particular the cellulose.

According to a preferred embodiment of the present invention, said lignin is selected from the group of lignins consisting of alkaline lignin from the Kraft or soda process, sulfur-free lignins, and derivatives therefrom, preferably a lignin amine salt, a submicron lignin, and a lignin neutralized with KOH.

Lignin from the Kraft process (sometimes called thio lignin or alkaline lignin)) is well-known. It is obtained during Kraft pulping in alkaline medium, as is known in the art. In the Kraft process, wood or annual plants are cooked with a solution, called "white liquor", containing sodium hydroxide and sodium sulfide. The dark solution of the degraded lignin which is dissolved out from the wood (the main product of said process being wood pulp) is commonly known as "black liquor". Said solution contains the degraded lignins and some degraded hemicelluloses which have been extracted from the wood during the Kraft process. Different ways are known to recover lignin from black liquor. One of the methods consists in acidification with different kinds of acidic aqueous solution, such as sulfuric acid and hydrochloric acid so that the pH level falls below pH 6, at about pH 2 to 4. Afterwards, the next steps are separation (or de-watering) steps, such as filtration, subsequent washing steps with acidic aqueous solution and separation processes (see EP 1 794 363 B1 for a detailed description). In a second method, gaseous carbon dioxide is added into the black liquor to acidify the solution followed by a separation process, such as filtration, subsequent washing steps with acidic aqueous solution and final separation processes (see U.S. Pat. No. 5,288,857 for a detailed description).

Lignin from the soda process is also well-known. In the soda process, predominantly non-wood fibres from annual plants, such as straw, sugarcane bagasse, flax etc. are processed with an aqueous solution of sodium hydroxide, occasionally under addition of anthraquinone. Since no sulfur-containing substance is added to the mixture, the resulting lignin is sulfur-free.

Sulfur-free lignins may be also obtained from, for example, biomass conversion technologies, solvent pulping processes (organosolv processes), additionally to soda pulping.

Biomass conversion technologies are predominantly used for the production of liquid fuels, such as ethanol, and typically involve hydrolytic pre-treatment of the biomass. From the pre-treated biomass, the lignin can be extracted (for example with a suitable organic solvent or an aqueous alkali solution) and subsequently precipitated.

The solvent pulping process is a known alternative to the Kraft process or sulfite process described above. During the pulping process, the lignin is dissolved in the applied organic solvent (e.g. ethanol), and may be subsequently precipitated therefrom. The resulting lignin is also called organosols lignin. A commercially applied solvent pulping process is the Alcell® process.

The soda pulping process is a sulfur-free process which may start from non-wood raw materials. The lignin is also here precipitated from the liquid phase obtained in the pulping process. As an example, the commercially used LPSO technology may be employed for obtaining sulfur-free lignin via this route. The LPSO technology leads to lignin having a relatively low silica and ash content. It is characterized by adjusting the pH of the alkaline pulping solution to acidic level and subsequent treatment of the thus obtained dispersion under a specific time and temperature schedule.

Processes for obtaining sulfur-free lignins are described in more detail, for example, in Lora et al., Journal of Polymers and the Environment, vol. 10, 2002, p. 39-47.

Alternatively, according to the present invention it is possible to use an alkaline lignin which has been prepared according to the method described in WO 2007/124400 A2 (Greenvalue S.A.). The content of WO 2007/124400 A2 is incorporated herein by reference. Basically, lignin from e.g. the above described soda process is subjected to a chemo-thermomechanical treatment involving mechanical shear at a maximum temperature of about 100-220° C. and a pressure of about 0.5 to 10 atmospheres in the presence of an additive such as a glycol or hexamethyltetramine which lowers the softening point of the lignin. Such alkaline lignins are commercially available as a dry powder under the trade name Protobind™ sold by ALM India. An exemplary lignin suitable for the present invention is sold under the commercial name Protobind™ 2000 or Protobind™ 2400. However, also other commercially available lignins from, for example, ALM India or Flambeau River paper may be used.

In U.S. Pat. No. 4,740,591 a method for forming an amine salt of lignin is described. In said method, lignin is precipitated from the black liquor residue of a Kraft pulping process by acidification and reacted with an organic amine, such as monoethanolamine. In this method the precipitated lignin is acidified to a pH of no lower than about 5 for the wash-water removal of inorganic salts and other impurities. The resulting lignin salt has a high level of water-solubility.

U.S. Pat. No. 5,008,378 teaches a method of producing lignin materials which, in liquid dispersion form, comprise particles having a median particle diameter of less than about one micron, and of such uniform shape and size so as to be readily employed as film-formers and additives in other products and chemical compositions. The lignin material product comprises colloidal dispersion of monodispersed lignin particles which coalesce and dry to form a continuous film which is useful as a binder in pigment printing, coating, and composite board manufacture. Such lignin is herein called "submicron lignin".

According to the present invention, thus a lignin should be used which is insoluble or poorly soluble in neutral water, but is soluble in aqueous alkaline solutions. For example, for lignin, sources include but are not limited to, lignin from softwoods, hardwoods and non-woods such as straw or flax, obtained by a pulping or delignification process including, but not limited to, Kraft, soda, soda-AQ (soda anthraquinone), soda-oxygen, and organosols, as well as from processes used in, for example, a biorefinery to pre-treat a vegetable biomass to produce ethanol and/or other products from any type of vegetable biomass, or in processes to produce dietary fiber.

Hemicelluloses are polysaccharides that are biosynthesized in the majority of plants, where they act as a matrix material present between the cellulose microfibrils and as a linkage between lignin and cellulose. Hemicelluloses are substituted/branched polymers of low to high molecular weight. The hemicellulose preferably used according to the present invention may have a molecular weight in the range of 8 000-50 000 g/mol.

Hemicelluloses consist of different sugar units arranged in different portions and with different substituents. The largest group of hemicelluloses are pentosan-rich polysaccharides (i.e. a polysaccharide having a pentosan content of at least 20% by weight, and a xylose content of at least 20% by weight). Examples of hemicelluloses suitable for the present invention are xylans, glucomannan, galactoglucomannan or arabinogalactan.

A particularly preferred hemicellulose, according to the present invention, is a xylan. Xylans are present in biomass such as wood, cereals, grass and herbs and they are considered to be the second most abundant biopolymer in the plant kingdom. To separate xylans from other components in various sources of biomass, extraction with water and aqueous alkali can be used. Xylans are also commercially available from sources as Sigma Chemical Company. Xylans may be divided into the sub-groups of heteroxylans and homoxylans. The chemical structure of homoxylans and heteroxylans differs. Homoxylans have a backbone of xylose residues and have some glucuronic acid or 4-O-methyl-glucuronic acid substituents. Heteroxylans also have a backbone of xylose residues, but are in contrast to homoxylans extensively substituted not only with glucuronic acid or 4-O-methyl-glucuronic acid substituents but also with arabinose residues. An example of homoxylan which can be used according to the invention is glucuronoxylan. Examples of heteroxylans which can be used according to the invention are arabinoxylan, glucuronoarabinoxylan and arabinoglucuronoxylan. According to the present invention, arabinoxylan is preferred.

According to a preferred embodiment of the present invention, the hemicellulose and/or the lignin is provided in the form of a varnish, wherein the varnish is preferably added to the composition in an amount from 20 to 60 wt.-% based on the weight of the entire composition, more preferably in an amount from 30 to 50 wt.-% based on the weight of the entire composition. Said varnish comprises preferably 1 to 20 wt.-%, more preferably 5 to 15 wt.-%, of the hemicellulose and/or the lignin in combination with one or more solvents and optionally an amine. As solvent, predominantly water is used, either alone or in a blend with a little amount (1 to 10 wt.-% of the amount of the water in the varnish) of an alcohol, for example ethanol. If an amine is present, the amount thereof should be preferably in a range between 0.1 to 10 wt.-%, more preferably 1 to 8 wt.-% of the weight of the entire varnish. The amounts of the porous submicron silica dispersion and the starch in this embodiment are as described above.

According to a specific third preferred embodiment, the composition of the present invention comprises porous submicron silica dispersion and starch, in combination with at least one component selected from the group consisting of a polyvinylacetate and a sulfopolyester. Preferably, both a polyvinylacetate and a sulfopolyester are present.

Polyvinylacetates are known in the art. According to the present invention, it is preferred to use polyvinylacetate copolymers, wherein the copolymer is composed of vinylacetate and an alkylene as monomers. As alkylene, preferably a $C_{2-8}$ alkylene, for example ethylene, propylene, 1-butylene, 2-butylene, 1-pentene, 2-pentene, 1-hexene, 2-hexene, 3-hexene, 1-heptene, 2-heptene, 3-heptene, or 1-octene, or mixtures thereof may be used. Especially preferred is ethylene. Vinylacetate and the alkylene monomer are polymerized by a radical polymerisation mechanism under conditions known to the skilled man.

Instead of or in addition to an alkylene, also other monomers such as acrylates, unsaturated fatty acids, unsaturated carboxylic acids such as maleic acid and esters therefrom, for example $C_{1-6}$ alkyl esters of maleic acid such as dimethyl maleate, diethyl maleate, dipropyl maleate, dibutyl maleate, dipentyl maleate, and dihexyl maleate, or mixed or half esters thereof, or other vinylic monomers such as vinyl chloride or vinyl esters may be used.

According to a preferred embodiment, the polyvinylacetate is a copolymer from vinyl acetate and a maleic ester, preferably dibutyl maleate. Such a copolymer is commercially available from Celanese as copolymer dispersion under the trade name Mowilith®.

According to the present invention, suitable sulfopolyester resins are sulfopolyester resins conventionally used in printing inks. Sulfopolyester resins are well-known and need not be discussed in detail. According to the present invention, suitable sulfopolyester resins may be obtained by reaction of diacids and diols, wherein the thus obtained polyesters are subsequently made water-dispersible by including sulfonate groups. The sulfopolyesters may be stabilized with a counter-ion like Na+ or any other cation conventionally used for that purpose. Examples of commercially available sulfopolyester resins suitable for the present invention are Hydro-Rez 1100D, Hydro-Rez 1200D2, Hydro-Rez 1400D (from Lawter), and Eastek 1000, Eastek 1100, Eastek 1200, Eastek 1300, Eastek 1400 (from Eastman).

According to a preferred embodiment of the present invention, each of the polyvinylacetate and the sulfopolyester are present in an amount from 10 to 40 wt.-% based on the weight of the entire composition, preferably in an amount from 15 to 30 wt.-% based on the weight of the entire composition. The amounts of the porous submicron silica dispersion and the starch in this embodiment are as described above.

According to a particularly preferred embodiment of the present invention, the polyvinylacetate and the sulfopolyester are present in combination in the composition, wherein the amount of both the polyvinylacetate and the sulfopolyester is in a range from 20 to 80 wt.-% based on the weight of the entire composition, preferably in a range from 30 to 60 wt.-% based on the weight of the entire composition. The amounts of the porous submicron silica dispersion and the starch in this embodiment are as described above.

According to a specific fourth preferred embodiment, the composition of the present invention comprises porous submicron silica dispersion and starch, in combination with a styrene-acrylic emulsion.

Suitable styrene-acrylic emulsions are known in the art and commercially available. Preferred styrene-acrylic copolymers have a glass transition temperature (Tg) in the range between 10° C. and 60° C., preferably between 30° C. and 50° C. A suitable polymer is commercially available from Indulor under the trade name Induprint SE 375. Other suitable commercially available products are Joncryl 537 from BASF, or Joncryl SCX 1602 from BASF.

If present, said styrene-acrylic emulsion is used in the composition, of the present invention in an amount in the range from to 50 wt.-% based on the weight of the entire composition, preferably in an amount from 25 to 45 wt.-% based on the weight of the entire composition. The amounts of the porous submicron silica dispersion and the starch in this embodiment are as described above.

The composition of the present invention may furthermore comprise additives such as solvents, fillers, surfactants, wax, adhesion promoters, plasticizers, anti-foam agents, retarders, biocides/preservatives, thickening agents, and the like. The exact composition of an ink composition of the present invention depends upon the specific requirements imposed on the printing ink, and may be readily adjusted by a skilled man.

The amount of such additives in the compositions of the present invention preferably lies in a range of 0-10 wt.-%, more preferably 1-5 wt.-%, and most preferably 1-3 wt.-%, of the weight of the entire composition.

The composition of the present invention may be prepared like conventional primer compositions, respectively, by mixing the individual components with each other under appropriate conditions.

Thus, the present invention is also related to a method for manufacturing a composition as described herein, comprising the step of mixing the components described above together under stirring.

The compositions of the present invention are especially suitable for preparing a primer layer on the surface of a substrate. In particular, said primer layers are especially suitable for use in a printing process employing a liquid toner.

Thus, the present invention is furthermore related to the use of a composition as described herein for preparing a primer layer on a substrate.

The primer composition of the present invention exhibits a number of advantages in that it provides enhanced liquid toner adhesion to paper or board substrates, as well as to a number of different polymeric substrates. In addition, the composition does not require the use of any additional primers or pre-coatings to achieve proper adhesion, and avoids the problems of solvent-based composition because it is a water-based composition. Also, with the composition of the present invention a primer layer having a smooth surface can be obtained, which improves the printing quality of the final printed article. As already mentioned above, the composition of the present invention has a high amount of renewable material, due to the presence of starch. Said renewable content preferably lies in a range of 20 to 60 wt.-% of the dry content of the composition (i.e. after removal of water). Accordingly, also the article to which the composition of the present invention is applied is more environmental-friendly.

The substrate to which the primer composition of the present invention is applied may be selected from a wide range of substrates commonly used in printing processes, especially printing processes employing a liquid toner. According to the present invention, the substrate preferably is a paper or a paperboard substrate. Alternatively, the substrate may be selected from polymer substrates such as polyethylene or polypropylene or polyethylene terephthalate polymers.

The present invention is furthermore related to a method of printing on a substrate, comprising the steps of preparing a primer layer on at least a part of one surface of said substrate using a composition as described herein, and printing on said primer layer using a liquid toner.

Before the primer composition of the present invention is applied to a substrate, the surface of the substrate may optionally be treated to ensure that the coating will wet out the surface of the substrate. Such treatment may involve conventional techniques such as a flame treatment or a high voltage corona discharge treatment.

The primer composition of the present invention can be applied to the substrate in any suitable manner including gravure coating, roll coating, wire rod coating, flexographic printing, spray coating and the like. The primer composition of the present invention is preferably applied such that upon drying, the coating forms a smooth, evenly distributed layer of 0.1 to 2 μm in thickness, and more preferably, from 0.3 to 1 μm in thickness, which imparts the desired printability and adhesion properties to the liquid toner ink and the substrate.

After the primer composition of the present invention is applied, it may be dried by hot air, radiant heat, or any other suitable means which provides a clear, adherent coated film.

A liquid toner can be printed onto a substrate using digital printing machines such as the printing machines from HP Indigo, for example HP Indigo 10000 digital press. Those machines are known in the art and need not be discussed here in detail. Also, the liquid toners to be used along with said printing machines, such as the ElectroInk toner, are known in the art and need not be discussed here in detail.

With substrates provided with a primer layer made from a primer composition according to the present invention, it is possible to obtain articles, printed with a liquid toner according to the above described printing process, wherein the print quality is similar to the print quality obtainable by offset printing.

Thus, the present invention is furthermore related to an article, manufactured with the above process. Articles obtainable with the composition of the present invention are suitable for a wide range of applications. In particular, they are suitable for all rigid and flexible packaging and labels in areas like food packaging (e.g., retortable bags, frozen food packaging, refrigerated food packaging, shelf stable food packaging, dry goods packaging, liquid food packaging, fast food wrappers and bags), pharmaceutical packaging (e.g., primary packaging, secondary packaging, booklets and instructions), personal hygiene packaging (e.g., soap packaging, hair care packaging, baby care packaging, feminine care packaging, male care packaging), home care packaging (e.g., detergent packaging, cleaner packaging), agricultural packaging (e.g., herbicide packaging, pest control packaging, fertilizer bags), industrial packaging (e.g., shopping bags, construction wrappers and bags), and pet care packaging (e.g., pet food bags, pet medical packaging, pet hygiene packaging). Such packagings and labels are known in the art and need not be discussed in detail here. Also, the article may be paper to be used in printing devices, for example copy paper in office printers.

The present invention will now be described in more detail with the aid of non-limiting examples.

EXAMPLE 1

A first primer composition was prepared from the following components:

TABLE 1

| Component | Amount (wt.-%) |
|---|---|
| Porous submicron silica dispersion | 20 |
| Rice starch | 20 |
| Polyvinylacetate-dibutyl maleate copolymer | 20 |
| Sulfopolyester | 20 |
| Water | 17.64 |
| Isopropanol | 2 |
| Antifoaming agent | 0.3 |
| Biocide/preservative | 0.06 |

The sulfopolyester used in this example had a Tg of 55° C. (Tg was measured by DSC (Differential Scanning Calorimetry) according to DIN 51007)

The composition was prepared by mixing the above components together under stirring at room temperature.

EXAMPLE 2

A second primer composition was prepared from the following components:

TABLE 2

| Component | Amount (wt.-%) |
|---|---|
| Porous submicron silica dispersion | 20 |
| Rice starch | 20 |
| Xylane varnish (10% xylane in water) | 35 |
| Water | 22.64 |
| Isopropanol | 2 |
| Antifoaming agent | 0.3 |
| Biocide/preservative | 0.06 |

The composition was prepared by mixing the above components together under stirring at room temperature.

EXAMPLE 3

A third primer composition was prepared from the following components:

TABLE 3

| Component | Amount (wt.-%) |
|---|---|
| Porous submicron silica dispersion | 20 |
| Rice starch | 20 |
| Gum arabic varnish (15% gum arabic in water/ethanol (94:6)) | 40 |
| Water | 17.64 |
| Isopropanol | 2 |
| Antifoaming agent | 0.3 |
| Biocide/preservative | 0.06 |

The composition was prepared by mixing the above components together under stirring at room temperature.

EXAMPLE 4

A fourth primer composition was prepared from the following components:

| Component | Amount (wt.-%) |
|---|---|
| Porous submicron silica dispersion | 20 |
| Rice starch | 20 |
| Styrene-acrylic emulsion | 40 |
| Water | 17.64 |
| Isopropanol | 2 |
| Antifoaming agent | 0.3 |
| Biocide/preservative | 0.06 |

The styrene-acrylic emulsion used in this example had a Tg of 44° C. (Tg was measured by DSC (Differential Scanning Calorimetry) according to DIN 51007)

The composition was prepared by mixing the above components together under stirring at room temperature.

Printability Tests

The primer compositions according to examples 1 to 4 were applied onto a coated DIN A4 paper (Invercote from Iggesund) by means of a RK manual tool with a soft rubber roll to achieve a thickness of 2.5 to 3 g/m².

Onto said substrate, a print was provided using an Officejet Pro 8100 ink-jet printing machine (this is a good model for printing systems using liquid toners).

The printing quality was assessed on a scale from 0 (bad) to 5 (good).

TABLE 4

Printability results

| Example | Printability result |
|---|---|
| Substrate with primer from example 1 | 4.2 |
| Substrate with primer from example 2 | 4 |
| Substrate with primer from example 3 | 4 |
| Substrate with primer from example 4 | 4 |

Transfer Test

The primer compositions according to examples 1 to 4 were applied onto a coated DIN A4 paper (Invercote from Iggesund) by means of a RK manual tool with a soft rubber roll to achieve a thickness of 2.5 to 3 g/m².

Onto said substrate, a printed polyester substrate (polyester printed with ElectroInk® from HP Indigo) was applied, so that the printed surface of the polyester substrate was adjacent to the primer layer on the paper substrate. The stack of the two substrates was passed through two rollers of a lamination machine (Polytype) with a speed of 10 m/min at a temperature of 80° C.

It was evaluated on a scale from 0 (no transfer) to 5 (total transfer) how much ink was transferred under these conditions from the printed polyester substrate to the primer layer.

TABLE 5

Transfer test results

| Example | Transfer |
|---|---|
| Substrate with primer from example 1 | 3.5 |
| Substrate with primer from example 2 | 3 |
| Substrate with primer from example 3 | 3 |
| Substrate with primer from example 4 | 4 |

The invention claimed is:

1. A water-based primer composition comprising:
   a porous submicron silica,
   starch, and
   at least one component selected from the group consisting of a further polysaccharide, a hemicellulose, lignin, styrene-acrylic emulsion, a polyvinylacetate and a sulfopolyester.

2. The primer composition according to claim 1, wherein the composition comprises water in an amount from 10 to 70 wt.-%, based on a weight of an entire composition.

3. The primer composition according to claim 1, wherein the starch is rice starch.

4. The primer composition according to claim 2, wherein the starch is rice starch.

5. The primer composition according to claim 1, wherein the at least one component is a further polysaccharide.

6. The primer composition according to claim 5, wherein the further polysaccharide is gum arabic.

7. The primer composition according to claim 1, wherein the at least one component is a hemicellulose or lignin or a styrene-acrylic emulsion.

8. The primer composition according to claim 7, wherein the hemicellulose is xylan.

9. The primer composition according to claim 1, wherein the at least one component is polyvinylacetate or sulfopolyester, or a combination thereof.

10. The primer composition according to claim 9, wherein the polyvinylacetate is a copolymer from vinyl acetate and a maleic ester.

11. The primer composition according to claim 9, wherein each of the polyvinylacetate and the sulfopolyester are present in an amount from 10 to 40 wt.-% based on a weight of an entire composition.

12. The primer composition according to claim 1, wherein the composition additionally comprises one or more additives selected from the group consisting of organic solvents, an anti-foaming agent and a biocide.

13. A method for manufacturing a composition according to claim 1, the method comprising mixing components of the composition together while stirring.

14. A method of use of the composition according to claim 1 for preparing a primer layer on a substrate, the method comprising applying the primer composition onto at least a part of one surface of the substrate.

15. A method of printing on a substrate, the method comprising:
   a) preparing a primer layer on at least a part of one surface of said substrate using the composition according to claim 1, and
   b) printing on said primer layer.

16. The method of printing on a substrate according to claim 15, further comprising using a liquid toner for printing on said primer layer.

17. An article manufactured according to the method of claim 14.

* * * * *